United States Patent [19]

Trahan

[11] Patent Number: 4,836,842
[45] Date of Patent: Jun. 6, 1989

[54] PLUNGER ASSEMBLY FOR A GLASSWARE FORMING MACHINE

[75] Inventor: Albert J. Trahan, Vernon, Conn.

[73] Assignee: Emhart Industries, Inc., Farmington, Conn.

[21] Appl. No.: 207,359

[22] Filed: Jun. 15, 1988

[51] Int. Cl.[4] ............................................. C03B 11/10
[52] U.S. Cl. ....................................... 65/362; 65/305; 65/319
[58] Field of Search .................. 65/305, 319, 323, 362

[56] References Cited

U.S. PATENT DOCUMENTS

| | | | |
|---|---|---|---|
| 3,607,206 | 9/1971 | Foster | 65/319 |
| 4,033,744 | 7/1977 | Davis | 65/362 |
| 4,636,240 | 1/1987 | Kozora | 65/362 |

Primary Examiner—Joye Woodard
Attorney, Agent, or Firm—Spencer T. Smith

[57] ABSTRACT

A plunger assembly includes a plunger which has a base portion secured within an opening in the closed top of a cylindrical plunger holder. The bottom of the plunger holder is open and two opposed locking flanges projected inwardly into the opening. An adapter having an upper portion above a support collar receives the plunger holder and the two parts are relatively rotated 90° to locate the locking flanges between the support collar and the bottom of opposed increased diameter portions on the adapter upper portion. Detents releasably retain the two parts at this relative orientation.

3 Claims, 5 Drawing Sheets

PLUNGER ASSEMBLY FOR A GLASSWARE FORMING MACHINE

BACKGROUND OF THE INVENTION

The present invention relates to individual section glassware forming machines which form glassware in the press and blow process, and more particularly, to the plunger mechanism of such machines which presses a molten gob of glass into a parison or preform. A plunger mechanism is disclosed in U.S. Pat. No. 4,272,273.

Because of the highly abrasive nature of the molten glass, plungers are subject to wear and must be periodically replaced. A recently issued U.S. Pat. No. 4,636,240 discloses a plunger assembly which permits a quicker changing of the plunger.

SUMMARY OF THE INVENTION

It is an object of the present invention to provide an improved quick change plunger assembly.

Other objects and advantages of the present invention will become apparent from the following portion of this specification and from the accompanying drawings which illustrate in accordance with the mandate of the patent statutes, a presently preferred embodiment incorporating the principles of the invention.

DESCRIPTION OF THE PREFERRED EMBODIMENT

Figure 2:
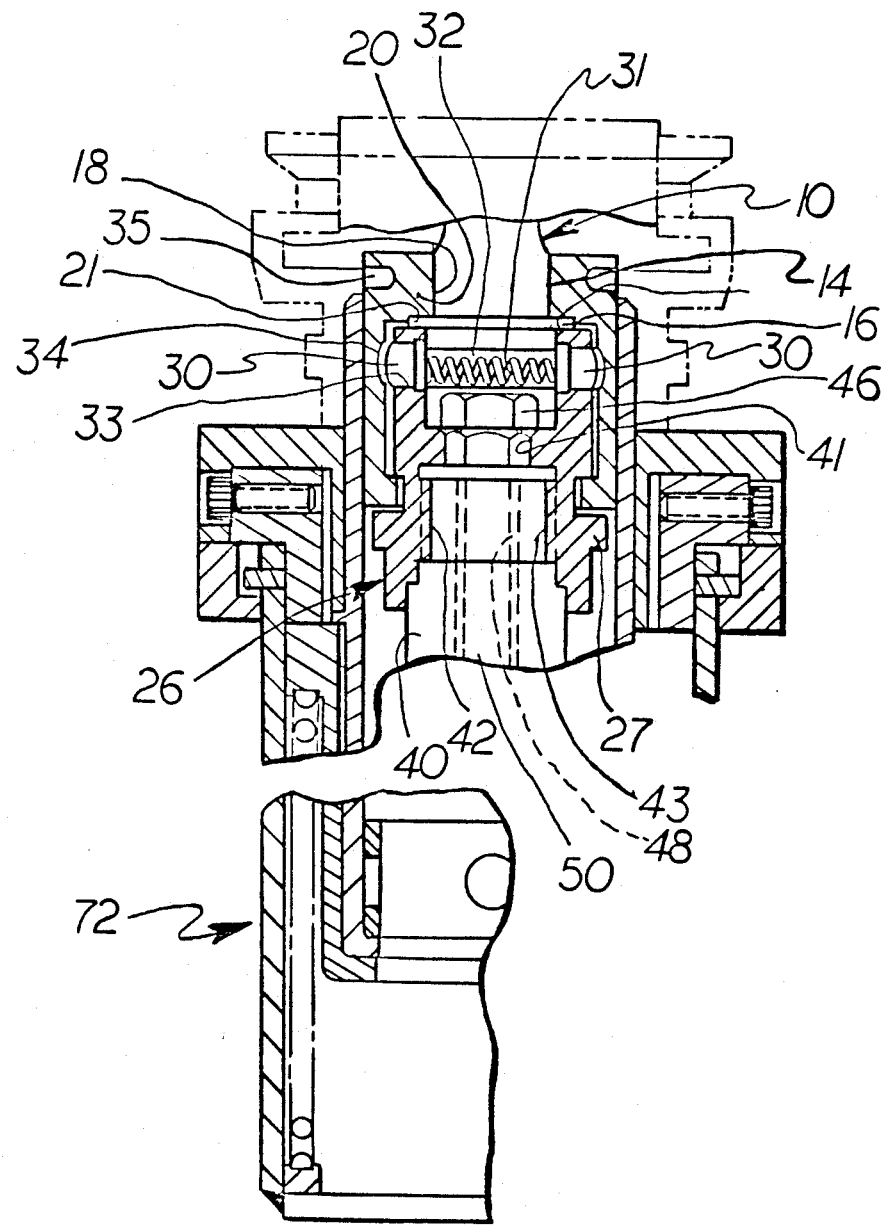
FIG. 2 is an axial cross-sectional view of the adapter assembly mounting the plunger to the vertically reciprocating piston of one of the cylinders in an individual section forming machine.
Figure 3:
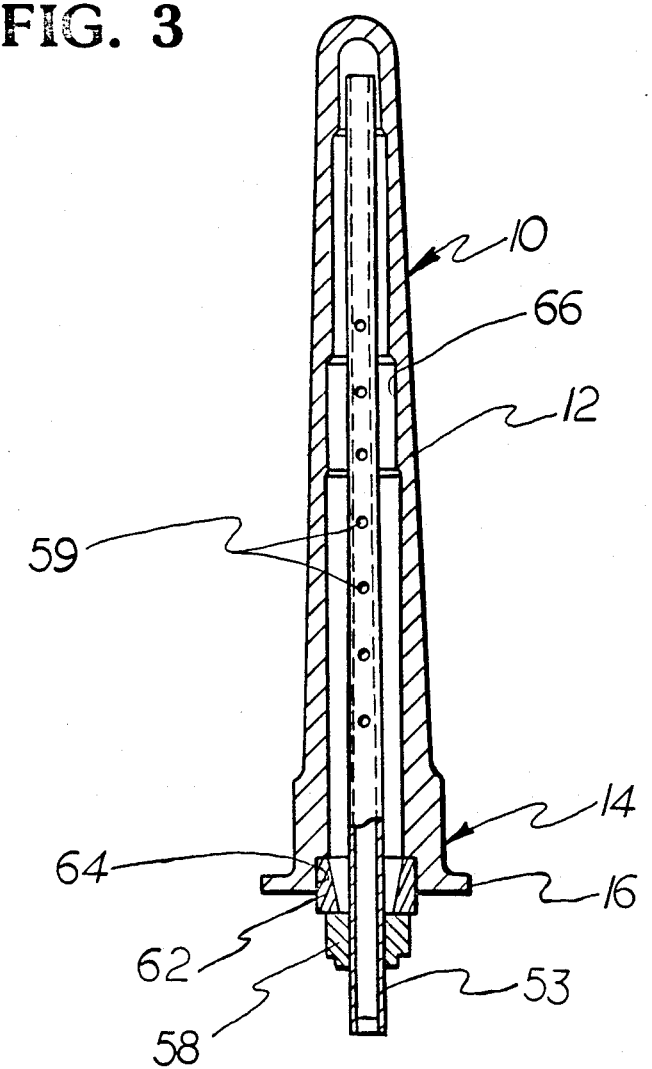
FIG. 3 is an axial cross-sectional view of the plunger with its cooling tube secured thereto.
Figure 4:
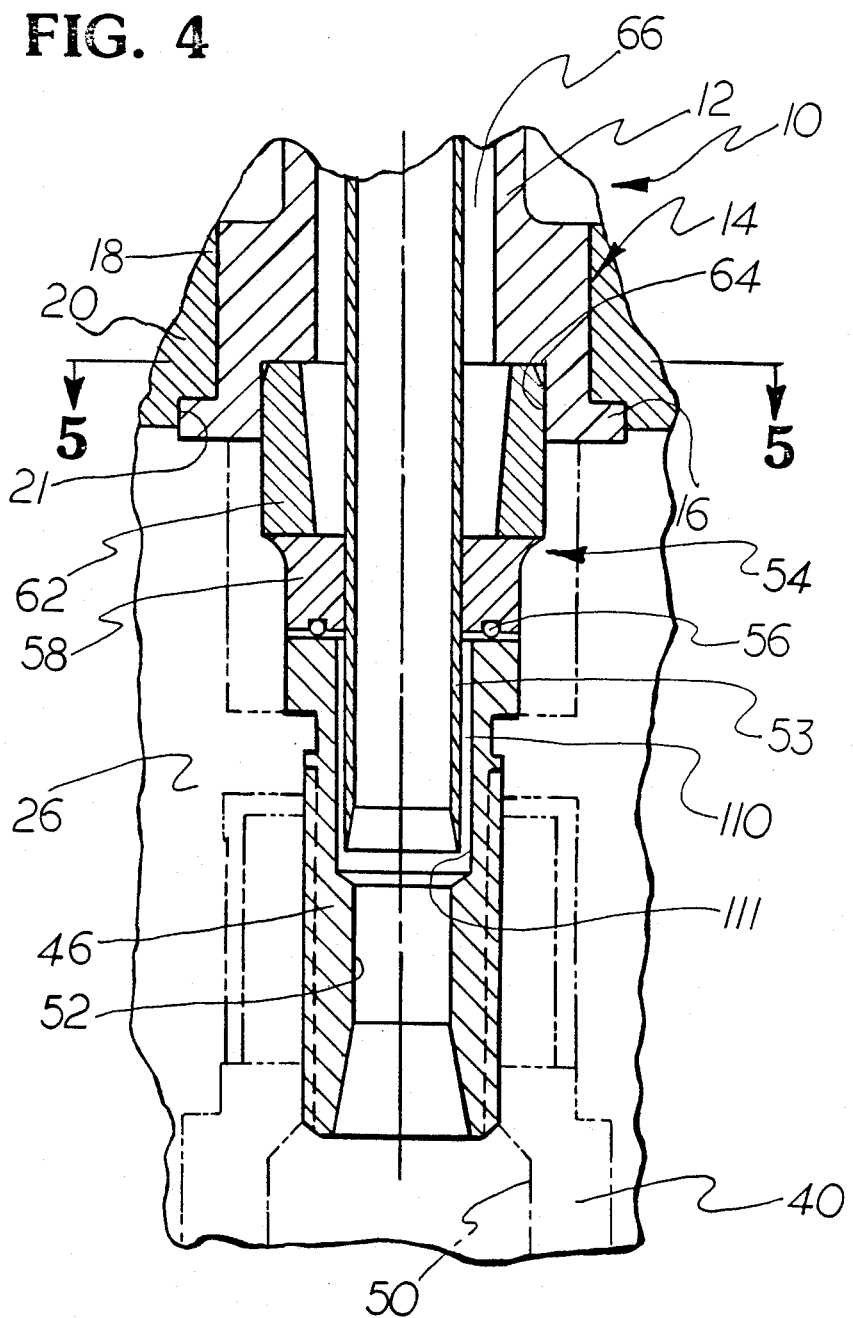
FIG. 4 is an enlarged view similar to that of FIG. 3 illustrating the lower portion of the adapter assembly secured to the reciprocating piston.

The plunger assembly includes a hollow plunger element 10 which has an elongated tapered upper or plunger portion 12 (FIG. 3) and a cylindrical bottom or base portion 14 which ends in annular flange 16. The cylindrical base portion 14 is press fitted into a thru-bore 18 in the top wall of a plunger holder 20 (FIGS. 2 and 4). This thru-bore 18 is suitably recessed 21 to partially receive the annular flange 16 thereby defining the bottom surface of the plunger element 10 as a bearing surface. The plunger holder 20 is cylindrical in shape having an open bottom 24, which is partially closed by a pair of opposed, axially downwardly and inwardly extending locking flanges 25.

The plunger assembly also includes an adapter 26 which has an upper portion above annular collar 27. The upper portion has a cylindrical body 28 which has a pair of opposed increased diameter portions 29 which define an outer diameter corresponding to the inner diameter of the plunger holder opening 24. These increased diameter portions 29 are discontinued at diametrically opposed locations to reduce the outer diameter of the upper portion sufficiently to permit the lowering of the plunger holder over the upper portion of the adapter when the location of these reduced diameter portions correspond to the location of the locking flanges 25. When the plunger holder is fully lowered, the bearing surface X of adapter 26.

The distance between the plunger bearing surface and the upper surface of these locking flanges 25 corresponds to the vertical height of the increased diameter portions 29 so that when the plunger holder 20 is fully lowered onto surface X of the adapter 26, the plunger holder can be rotated 90° to locate the locking flanges 25 between these increased diameter portions 29 and the adapter collar 27, thereby preventing vertical separation of the plunger holder and the adapter. An opposed pair of detents 30, which are biased outwardly through detent apertures 33 (FIG. 2) by a spring 31 contained within a suitable groove 32 in the plunger adapter and which enter recesses 34 in the plunger holder when so rotated, prevent the unintentional rotation of the plunger holder 20 relative to the adapter 26. There are four recesses; two to locate to retain adapter in position and two to locate the adapter for removal. To join these pieces together by locating the detents in their associated recesses 34 or to release them, a tool (not shown) can be used which has opposed keys for engaging opposed holder slots 35. A pair of notches 34a are cut in the inner wall of the holder at the bottom to cam the detents inwardly as the plunger holder is lowered onto the adapter.

To join the plunger assembly to the vertically reciprocating piston 40, the bottom of the adapter has an upwardly extending threaded bore 42 which threads onto a threaded portion 43 on the top of the piston 40. (The adapter may if desired be one piece with the piston 40) A hex opening 41 permits the use of a hex head tool to thread the adapter onto the piston. To lock these members together, a bolt 46 extends downwardly through the hex opening 41 in the adapter and is threadedly received by a threaded bore 48 in the top portion of the piston 40.

Figure 1:
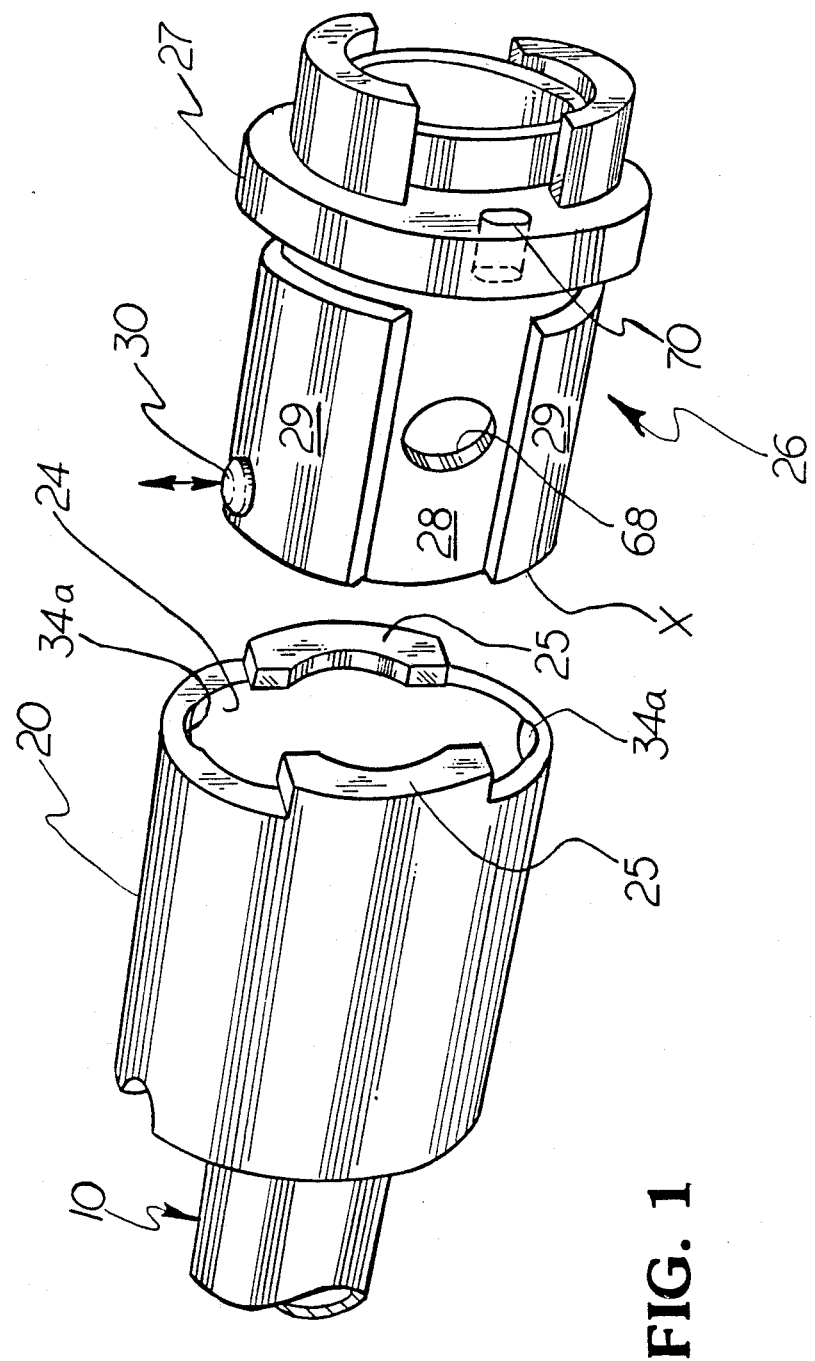
FIG. 1 is an oblique, exploded view of the plunger, the plunger holder and adapter of the plunger adapter assembly made in accordance with the teachings of the present invention.
Figure 5:
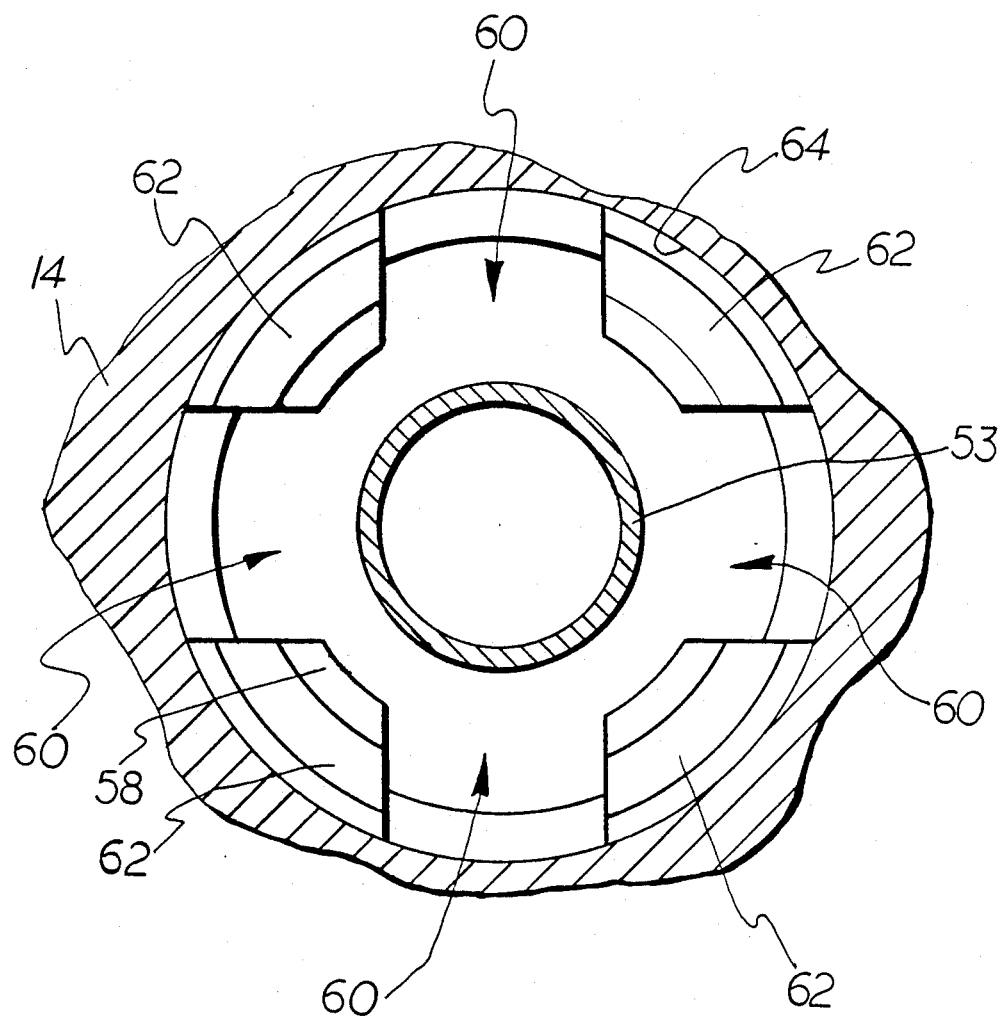
FIG. 5 is a view taken along the lines 5—5 of FIG. 4.

Cooling air is supplied upwardly through the center hole 50 of the piston 40 (FIG. 4), through the center hole 52 of the locking bolt 46 and then through the elongated tube 53 of the cooling tube assembly 54 (an "O" ring 56 effects a seal between the locking bolt 46 and the annular collar 58 of the cooling tube assembly to which the cooling tube is secured) and out holes 59 in the cooling tube. This air flows downwardly along the plunger and outwardly through the openings 60 (see FIG. 5) between four wedge elements 62 of the cooling tube assembly, which are integral with the annular collar 58 and which are wedgingly received within a recess 64 defined at the entrance of the plunger opening 66 to secure and maintain the cooling tube in precisely centered and axially located within the plunger throughout the operation of the plunger assembly. Since the air has been heated, it has a greater volume than the inleted air. Accordingly, the size of this collective opening 60 should be at least two and one half times larger than the area of the cooling tube 53. The exhausted, heated air passes through opposed holes 68 (FIG. 1) in the adapter upper portion and flows downwardly through the channels formed between the enlarged diameter sections 29, the upper body 28 and the plunger holder 20 through holes 70 in the annular adapter collar and into the plunger housing assembly 72 (FIG. 2).

I claim:

1. A plunger assembly for use in a glassware forming machine comprising:
   a plunger having a tapered portion and a base portion,
   a plunger holder including
   a hollow cylindrical housing having an interior wall, a closed top and an open bottom,
   aperture means in the closed top of said cylindrical housing for receiving said plunger base portion, and
   a pair of opposed locking flanges extending axially downwardly and inwardly from the open bottom of said cylindrical housing,
   an adapter assembly including
   an annular support collar having an outer diameter,
   a hollow cylindrical body, having an interior wall, a top and a smaller outer diameter than the outer diameter of said collar, extending upwardly from said collar for full insertion into the cylindrical housing through the open bottom so as to support the open bottom on the annular support collar,
   a pair of opposed enlarged diameter portions extending downwardly from the top of said cylindrical body to a location vertically spaced from said collar, said portions defining with the outer diameter of said annular collar opposed, reduced diameter areas extending between the vertically spaced location and said annular collar,
   said locking flanges having a vertical height corresponding to the reduced diameter areas so that cylindrical body of said adapter assembly is fully inserted into the cylindrical housing of said plunger holder, said plunger holder can be rotated 90° relative to said adapter assembly, whereby vertical separation will be prevented,
   means for releasably retaining said plunger holder and said adapter assembly at the 90° rotated orientation,
   means for threadedly securing said adapter assembly to the top of a vertically displaceable piston.

2. A plunger assembly according to claim 1, wherein said releasably retaining means comprises outwardly biased detent means secured to the interior wall of said cylindrical body and including a detent extending outwardly through a hole formed in each of said enlarged diameter portions, and opposed recess means formed in the interior wall of said cylindrical housing for receiving the detents.

3. A plunger assembly according to claim 2, wherein said plunger base portion has an outwardly extending annular flange and said aperture means in the closed top of said cylindrical housing includes an internal recess so that when said plunger base portion is fully inserted thereinto, the annular flange of said base portion will project into said recess and downwardly beyond said closed top of said cylindrical housing, thereby defining a bearing surface for the top of the cylindrical body of said adapter assembly when fully inserted into the cylindrical housing of said plunger holder.

* * * * *